(12) United States Patent
Takazawa et al.

(10) Patent No.: US 11,186,165 B2
(45) Date of Patent: Nov. 30, 2021

(54) HEAT DISTRIBUTION DEVICE FOR HYBRID VEHICLE

(71) Applicant: Honda Motor Co., Ltd., Tokyo (JP)

(72) Inventors: Masanobu Takazawa, Saitama (JP); Hajime Uto, Saitama (JP); Masayuki Toyokawa, Saitama (JP); Naoaki Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 16/746,950

(22) Filed: Jan. 19, 2020

(65) Prior Publication Data
US 2020/0238818 A1 Jul. 30, 2020

(30) Foreign Application Priority Data

Jan. 28, 2019 (JP) .............................. JP2019-011882

(51) Int. Cl.
| B60H 1/32 | (2006.01) |
| B60K 11/02 | (2006.01) |
| B60H 1/00 | (2006.01) |
| B60L 58/26 | (2019.01) |
| B60L 58/12 | (2019.01) |

(52) U.S. Cl.
CPC .......... B60K 11/02 (2013.01); B60H 1/00278 (2013.01); B60L 58/26 (2019.02); B60L 58/12 (2019.02)

(58) Field of Classification Search
CPC .......... B60K 11/02; B60L 58/26; B60L 58/12; B60H 1/00278

USPC .......................................................... 62/239
See application file for complete search history.

(56) References Cited

U.S. PATENT DOCUMENTS

| 5,623,194 A * | 4/1997 | Boll ...................... B60L 53/305 |
| | | 320/137 |
| 2008/0053716 A1 * | 3/2008 | Scheucher .............. B60L 50/66 |
| | | 180/2.1 |
| 2017/0240162 A1 * | 8/2017 | Higashitani ............. B60L 58/20 |
| 2019/0217721 A1 * | 7/2019 | Marcicki ............... H01M 10/66 |

FOREIGN PATENT DOCUMENTS

JP        H11-313406        11/1999

* cited by examiner

*Primary Examiner* — Davis D Hwu
(74) *Attorney, Agent, or Firm* — JCIPRNET

(57) ABSTRACT

A heat distribution device for hybrid vehicle is provided, including: an engine cooling circuit through which cooling water for cooling an internal combustion engine circulates; a MG cooling circuit through which a refrigerant for cooling a motor generator circulates; and a heat exchanger which performs heat exchange between the cooling water and the refrigerant. When it is determined based on a charging rate SOC of a battery that the battery can be charged, charging control is performed to charge the battery with electric power generated in a regenerative operation; when it is determined that the battery cannot be charged, heat dissipation control is performed to dissipate the heat generated by the regenerative operation to the engine cooling circuit side by the heat exchange between the refrigerant and the cooling water in the heat exchanger.

6 Claims, 7 Drawing Sheets

HEAT DISTRIBUTION DEVICE FOR HYBRID VEHICLE

CROSS REFERENCE TO RELATED APPLICATIONS

This application claims the priority benefit of Japanese Patent Application No. 2019-011882, filed on Jan. 28, 2019. The entirety of the above-mentioned patent application is hereby incorporated by reference herein and made a part of this specification.

BACKGROUND OF THE DISCLOSURE

Technical Field

The disclosure relates to a heat distribution device for hybrid vehicle which distributes, in a hybrid vehicle having an internal combustion engine and a motor generator, heat generated in the motor generator.

Related Art

As a conventional cooling device for a hybrid vehicle, for example, a cooling device described in patent literature 1 (Japanese Patent Application Laid-Open No. 11-313406) is known. The hybrid vehicle includes an engine and a rotary electric machine (motor generator) capable of power running and regeneration as a drive source. In addition, the cooling device includes: an engine cooling circuit through which a coolant (engine coolant) for cooling the engine circulates; a rotary electric machine cooling circuit through which a coolant (rotary electric machine coolant) for cooling the rotary electric machine and an electric power converter thereof circulates; a heat exchanger which performs heat exchange between the coolants of the above two cooling circuits; a switching valve which selectively connects the rotary electric machine cooling circuit to the heat exchanger side or the side of a bypass passage for bypassing the heat exchanger; and a radiator, a pump and the like arranged in each cooling circuit.

In addition, the temperatures of the rotary electric machine coolant at an inlet and an outlet of the heat exchanger are respectively detected as an inlet temperature Tmin and an outlet temperature Tmout. Then, when the inlet temperature Tmin <the outlet temperature Tmout and the inlet temperature Tmin >an upper limit temperature Tmmax of the rotary electric machine are satisfied, the rotary electric machine side receives heat from the engine side and may overheat, and thus the overheat of the rotary electric machine and the like is prevented by switching the switching valve to the bypass passage side. On the other hand, if the above conditions are not satisfied, the rotary electric machine side does not receive heat from the engine side or the rotary electric machine and the like may not overheat, and thus heat dissipation from the rotary electric machine side to the engine side is promoted by switching the switching valve to the heat exchanger side.

In the conventional cooling device described above, it is limited to control a substantial activation or deactivation of the heat exchanger and control the heat exchange between the rotary electric machine and the engine based on a relationship between the inlet temperature Tmin and the outlet temperature Tmout of the rotary electric machine coolant in the heat exchanger, that is, a relative temperature relationship between the rotary electric machine and the engine or a relationship between the temperature of the rotary electric machine and the upper limit temperature of the rotary electric machine. Therefore, even when there is a component other than the engine that requires the heat generated in the rotary electric machine, the heat of the rotary electric machine cannot be distributed to the component.

In addition, in a state that the battery is fully charged or almost fully charged, even if electric power is generated by a regenerative operation of the rotary electric machine, the electric power cannot be charged into the battery and is inevitably dissipated (consumed) in the form of heat. In this case, in the conventional cooling device, along with a delay before the heat generation in the rotary electric machine is reflected at the inlet of the heat exchanger, the relationship that the inlet temperature Tmin >the outlet temperature Tmout is not immediately satisfied, and thus the heat exchanger does not operate and cannot dissipate the heat to the engine side.

The disclosure provides a heat distribution device for hybrid vehicle, which is capable of appropriately distributing heat generated in a motor generator during regenerative operation to vehicle components and effectively utilizing the heat or dissipating the heat to the outside.

SUMMARY

According to one embodiment, the disclosure provides a heat distribution device for hybrid vehicle, which distributes, in a hybrid vehicle having an internal combustion engine and a motor generator, heat generated in the motor generator, the motor generator converting an electric power of a battery into a mechanical power or converting the mechanical power into the electric power by a regenerative operation and collecting the electric power to the battery. The heat distribution device for hybrid vehicle includes: an engine cooling circuit through which cooling water for cooling the internal combustion engine circulates; a motor generator cooling circuit through which a refrigerant for cooling the motor generator circulates and which is independent from the engine cooling circuit; a heat exchanger which performs heat exchange between the cooling water of the engine cooling circuit and the refrigerant of the motor generator cooling circuit; a charging rate acquisition unit which acquires a charging rate SOC of the battery; a charging determination unit which determines, based on the acquired charging rate SOC of the battery, whether the battery can be charged; and a control unit, wherein in a case the regenerative operation is performed, the control unit performs charging controls to charge the battery with the electric power generated by the regenerative operation when it is determined that the battery can be charged, and performs heat dissipation controls to transfer the heat generated by the regenerative operation to the heat exchanger via the motor generator cooling circuit and dissipate the heat to the engine cooling circuit side by the heat exchange in the heat exchanger when it is determined that the battery cannot be charged.

In addition, according to another embodiment, the disclosure provides a heat distribution device for hybrid vehicle, which distributes, in a hybrid vehicle having an internal combustion engine and a motor generator, heat generated by a regenerative operation of the motor generator, the motor generator converting an electric power of a battery into a mechanical power or converting the mechanical power into the electric power by the regenerative operation and collecting the electric power to the battery. The heat distribution device for hybrid vehicle includes: an engine cooling circuit through which cooling water for cooling the internal combustion engine circulates; a motor generator cooling circuit through which a refrigerant for cooling the motor generator circulates and which is independent from the engine cooling circuit; a heat exchanger which performs heat exchange between the cooling water of the engine cooling circuit and the refrigerant of the motor generator cooling circuit; and a control unit which performs heat dissipation control in which the heat generated by the regenerative operation is transferred to the heat exchanger via the motor generator cooling circuit and is dissipated to the engine cooling circuit side by the heat exchange in the heat exchanger. The engine cooling circuit has a main circuit in which the cooling water circulates through the internal combustion engine, a heat accumulator flow path which is connected to the main circuit and is equipped with a heat accumulator for accumulating heat of the cooling water, and a radiator circuit which is connected to the main circuit and is equipped with a radiator for dissipating the heat of the cooling water to an outside. The engine cooling circuit further includes a first on-off valve for opening and closing the heat accumulator flow path, a second on-off valve for opening and closing the radiator circuit according to a temperature of the internal combustion engine, and temperature detection units which respectively detect the temperature of the internal combustion engine and a temperature of the heat accumulator. The control unit controls heat dissipation to the heat accumulator, the internal combustion engine, and the radiator by controlling the first on-off valve according to the detected temperature of the internal combustion engine and the detected temperature of the heat accumulator.

DESCRIPTION OF THE EMBODIMENTS

Figure 1:
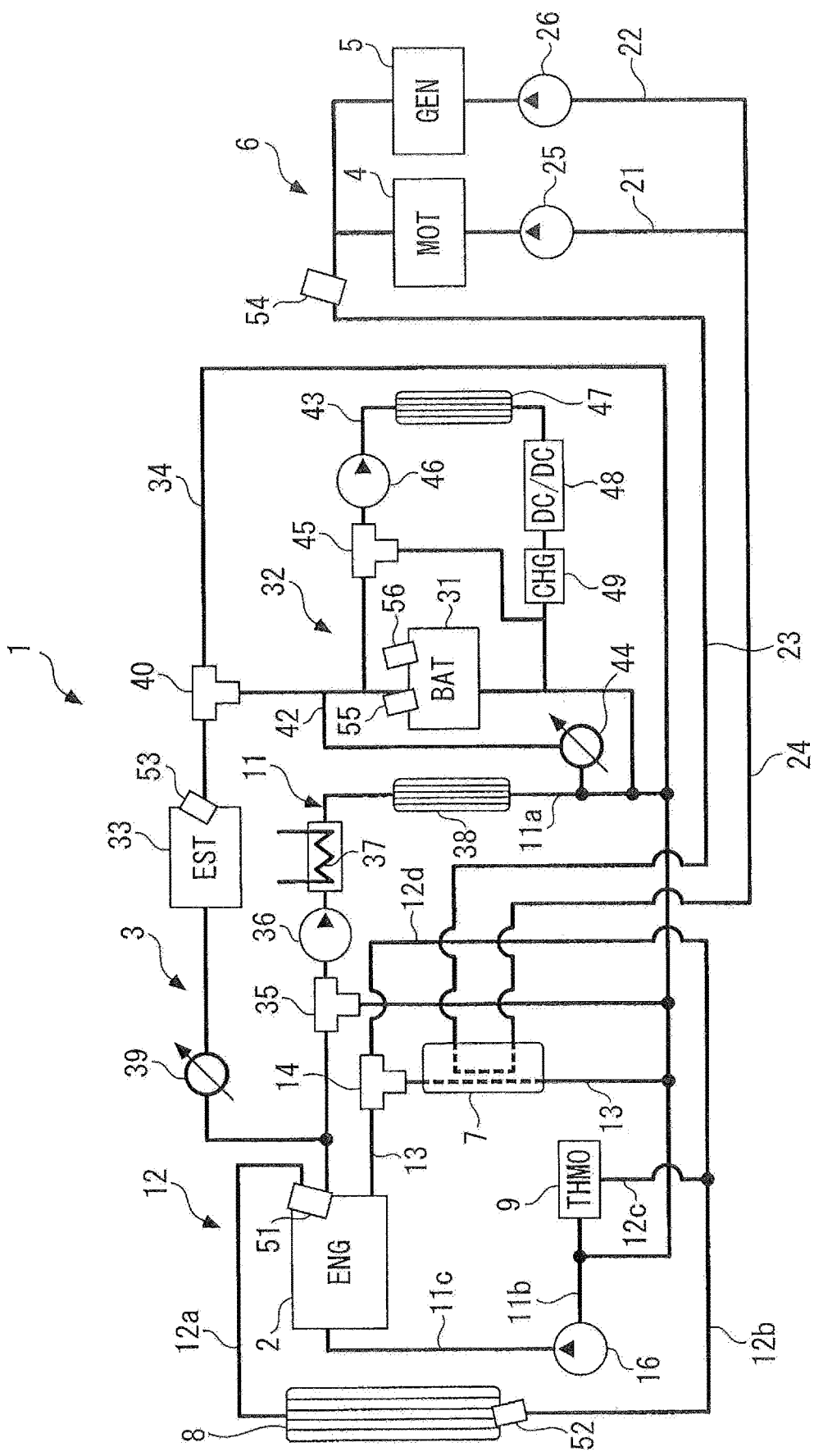
FIG. 1 is a diagram schematically showing a cooling device including a heat distribution device for hybrid vehicle according to an embodiment of the disclosure.

Hereinafter, preferred embodiments of the disclosure are described in detail with reference to the diagrams. FIG. 1 schematically shows a cooling device including a heat treatment device according to an embodiment of the disclosure. As shown in the diagram, the cooling device 1 is applied to a hybrid vehicle including an internal combustion engine 2 and a motor 4 mounted as drive sources and a generator 5 or a battery 31. In this example, the motor generator is configured by the motor 4 and the generator 5 which are separate from each other.

The cooling device 1 includes an engine cooling circuit 3 through which cooling water (for example, LLC (Long Life Coolant)) for cooling the internal combustion engine (hereinafter referred to as "the engine") 2 circulates; a MG (motor generator) cooling circuit 6 through which oil (for example, ATF (Automatic Transmission fluid)) serving as a refrigerant for cooling the motor 4 and the generator 5 circulates; a heat exchanger 7 for performing heat exchange between the cooling water and the oil; a battery cooling circuit 32 through which cooling water for cooling the battery 31 circulates; and the like.

The engine cooling circuit 3 includes a main circuit 11 through which the cooling water can circulate constantly; a radiator circuit 12 which has a radiator 8 and circulates the cooling water between the engine 2 and the radiator 8; a heat exchanger flow path 13 which has a heat exchanger 7 and brings the cooling water flowing out from the engine 2 to the heat exchanger 7 back to the main circuit 11; a first three-way valve 14 which is arranged in the heat exchanger flow path 13 and switches flow paths of the cooling water; a heat accumulator flow path 34 which has a heat accumulator 33 and supplies high-temperature cooling water accumulated in the heat accumulator 33 to the main circuit 11; and the like. Besides, the radiator 8 is disposed at the front of the hybrid vehicle, and a grill shutter 50 (see FIG. 2) with a variable opening for introducing cold air into the radiator 8 is arranged on the front side of the radiator 8.

The main circuit 11 has first to third flow paths 11a-11c. The first flow path 11a is connected to a cooling water outlet of a water jacket (not shown) of the engine 2, the second flow path 11b is arranged to connect a thermostat 9 and a first water pump 16 that is electric, and the third flow path 11c is arranged to connect the first water pump 16 and the cooling water inlet of the water jacket. The first flow path 11a is connected to the middle of the second flow path 11b. In addition, in the first flow path 11a, a second three-way valve 35, a second water pump 36 that is electric, a heater 37, a heater core 38 used for vehicle heating, and the like are arranged in order from the engine 2 side.

In the main circuit 11 configured in this way, when the first water pump 16 is driven, the cooling water flowing out from the cooling water outlet of the engine 2 flows in order through the first to the third flow paths 11a-11c into the cooling water inlet of the engine 2 and circulates.

The radiator circuit 12 has first to fourth flow paths 12a-12d and shares the second flow path 11b and the third flow path 11c of the main circuit 11. Specifically, the first flow path 12a is arranged to connect the cooling water outlet of the engine 2 and the radiator 8, and the second flow path 12b extends from the radiator 8 to the downstream side. The downstream side of the second flow path 12b branches into the third flow path 12c and the fourth flow path 12d, the downstream end of the third flow path 12c is connected to the thermostat 9, and the downstream end of the fourth flow path 12d is connected to the first three-way valve 14. The thermostat 9 is configured to block the radiator circuit 12 when the temperature of the cooling water flowing through the radiator circuit 12 is equal to or less than a predetermined temperature (for example, 90° C.) and open the radiator circuit 12 when the temperature of the cooling water exceeds the predetermined temperature.

In the radiator circuit 12 configured in this way, when the first water pump 16 is driven and the temperature of the cooling water rises and exceeds the predetermined temperature, the cooling water flowing out from the engine 2 due to the opening of the thermostat 9 circulates in a manner of flowing in order through the first flow path 12a, the radiator 8, the second flow path 12b, the third flow path 12c, the thermostat 9, and the second flow path 11b and the third flow path 11c of the main circuit 11 and returning to the engine 2. Thereby, the heat of the cooling water is dissipated from the radiator 8 to the outside. On the other hand, when the cooling water is equal to or less than the predetermined temperature, the thermostat 9 is kept closed, and the above cooling water circulation does not occur.

The upstream end of the heat exchanger flow path 13 is connected to the first three-way valve 14 and extends through the heat exchanger 7, and the downstream end is connected to a part of the main circuit 11 between the heater core 38 and the water pump 16.

In this configuration, the cooling water flowing from the engine 2 into the heat exchanger flow path 13 via the first three-way valve 14 flows into the first flow path 11a of the main circuit 11 through the heat exchanger 7. In addition, when the cooling water flows through the heat exchanger 7, as described later, heat exchange is performed with oil in the MG cooling circuit 6.

In addition, the heat accumulator flow path 34 branches from the upstream side of the second three-way valve 35 in the main circuit 11 and joins on the downstream side of the heater core 38. In the heat accumulator flow path 34, a first flow rate control valve 39 for adjusting the flow rate of the cooling water, the heat accumulator 33, and a third three-way valve 40 are arranged in order from the engine 2 side (upstream side). The heat accumulator 33 has a double structure of inside structure and outside structure, stores, in an adiabatic state, the cooling water heated during operation of the engine 2, and supplies it to the engine 2 during warm-up operation to promote the warm-up.

In addition, the MG cooling circuit 6 has a motor flow path 21, a generator flow path 22, a feed flow path 23 and a return flow path 24. The motor flow path 21 is passed through the motor 4, has a motor oil pump 25, and is connected to the feed flow path 23 and the return flow path 24 at two ends. The generator flow path 22 is passed through the generator 5, has a generator oil pump 26, and is connected, in parallel with the motor flow path 21, to the feed flow path 23 and the return flow path 24 at two ends.

The feed flow path 23 is connected to the motor flow path 21 and the generator flow path 22 on one end side, and is connected to the oil inlet of the heat exchanger 7 on the other end side. Similarly, the return flow path 24 is connected to the motor flow path 21 and the generator flow path 22 on one end side, and is connected to the oil outlet of the heat exchanger 7 on the other end side.

In the MG cooling circuit 6 configured as described above, when the motor oil pump 25 is driven, the oil flowing out from the motor 4 flows from the motor flow path 21 to the feed flow path 23, flows into the heat exchanger 7, and returns to the motor oil pump 25 via the return flow path 24 and the motor flow path 21 after flowing out through the inside of the heat exchanger 7. Similarly, when the generator oil pump 26 is driven, the oil flowing out from the generator 5 flows from the generator flow path 22 to the feed flow path 23, flows into the heat exchanger 7, and returns to the generator oil pump 26 via the return flow path 24 and the generator flow path 22 after flowing out through the inside of the heat exchanger 7. Besides, when the oil circulates in this way, in the heat exchanger 7, heat exchange is performed between the oil and the cooling water flowing into the heat exchanger 7 via the heat exchanger flow path 13.

Furthermore, the battery cooling circuit 32 has a main circuit 42 and a radiator circuit 43. The main circuit 42 branches from a branch portion immediately downstream of the heater core 38 of the main circuit 11 of the engine cooling circuit 3 to form a closed circuit, and returns to the downstream side of the branch portion of the main circuit 11 and joins on the downstream side. The main circuit 42 is passed through the battery 31, has a second flow rate control valve 44 for adjusting the flow rate of the cooling water, and is connected to the third three-way valve 40 of the heat accumulator flow path 34.

The radiator circuit 43 is connected in parallel to the upstream side and the downstream side of the battery 31 of the main circuit so as to bypass the battery 31. In the radiator circuit 43, a fourth three-way valve 45, a third water pump 46 that is electric, a battery radiator 47, a DC/DC converter 48, and a charger 49 are arranged in order from the upstream side. The fourth three-way valve 45 is also connected to the downstream side of the charger 49 in the radiator circuit 43.

In the battery cooling circuit 32 configured as described above, when the second flow rate control valve 44 is opened, the cooling water flows from the main circuit 11 of the engine cooling circuit 3 into the main circuit 42 and circulates through the battery 31 according to the opening of the second flow rate control valve 44. Thereby, the battery 31 is heated or cooled by the cooling water according to a temperature relationship between the cooling water and the battery 31. In addition, when the third water pump 46 is driven, the cooling water is sent from the main circuit 42 to the radiator circuit 43. Thereby, the heat of the cooling water is dissipated from the battery radiator 47 to the outside, and the DC/DC converter 48 and the charger 49 are cooled.

In addition, in this cooling device, sensors for detecting temperature states of various devices are arranged as follows. An engine water temperature sensor 51 that detects the temperature of the cooling water near the cooling water outlet of the engine 2 (hereinafter referred to as "engine water temperature TW") is arranged in the engine 2. In addition, a radiator water temperature sensor 52 that detects the temperature of the cooling water near the outlet of the radiator 8 (hereinafter referred to as "radiator water temperature TWR") is arranged in the radiator 8, and detection signals of the sensors are output to an ECU 10 (electronic control unit) described later (see FIG. 2).

In addition, a heat accumulator water temperature sensor 53 that detects the temperature of the cooling water near the outlet of the heat accumulator 33 (hereinafter referred to as "heat accumulator water temperature TWEST") is arranged in the heat accumulator 33, an oil temperature sensor 54 that detects the temperature of the oil (hereinafter referred to as "oil temperature TATF") is arranged in the feed flow path 23 of the MG cooling circuit 6, and a battery water temperature sensor 55 that detects the temperature of the cooling water near the inlet of the battery 31 (hereinafter referred to as "battery temperature TWBAT") is arranged in the battery 31, and detection signals of the sensors are output to the ECU 10 (see FIG. 2).

Furthermore, a detection signal indicating a current/voltage flowing through the battery 31 is input from a current and voltage sensor 56 arranged in the battery 31 to the ECU 10. The ECU 10 calculates an actual charging rate SOC of the battery 31 based on these detection signals.

The ECU 10 is configured by a microcomputer including a CPU, a RAM, a ROM, an I/O interface (none of the parts are shown), and the like. The ECU 10 controls the cooling device 1 by controlling, according to the detection signals and the like from the above various temperature sensors 51-55, the above various devices of the cooling device 1 (the first to the third water pumps 16, 36 and 46, the motor and generator oil pumps 25, 26, the first and second flow rate control valves 39 and 44, the first to the fourth three-way valves 14, 35, 40 and 45, the grill shutter 50, and the like).

Figure 2:
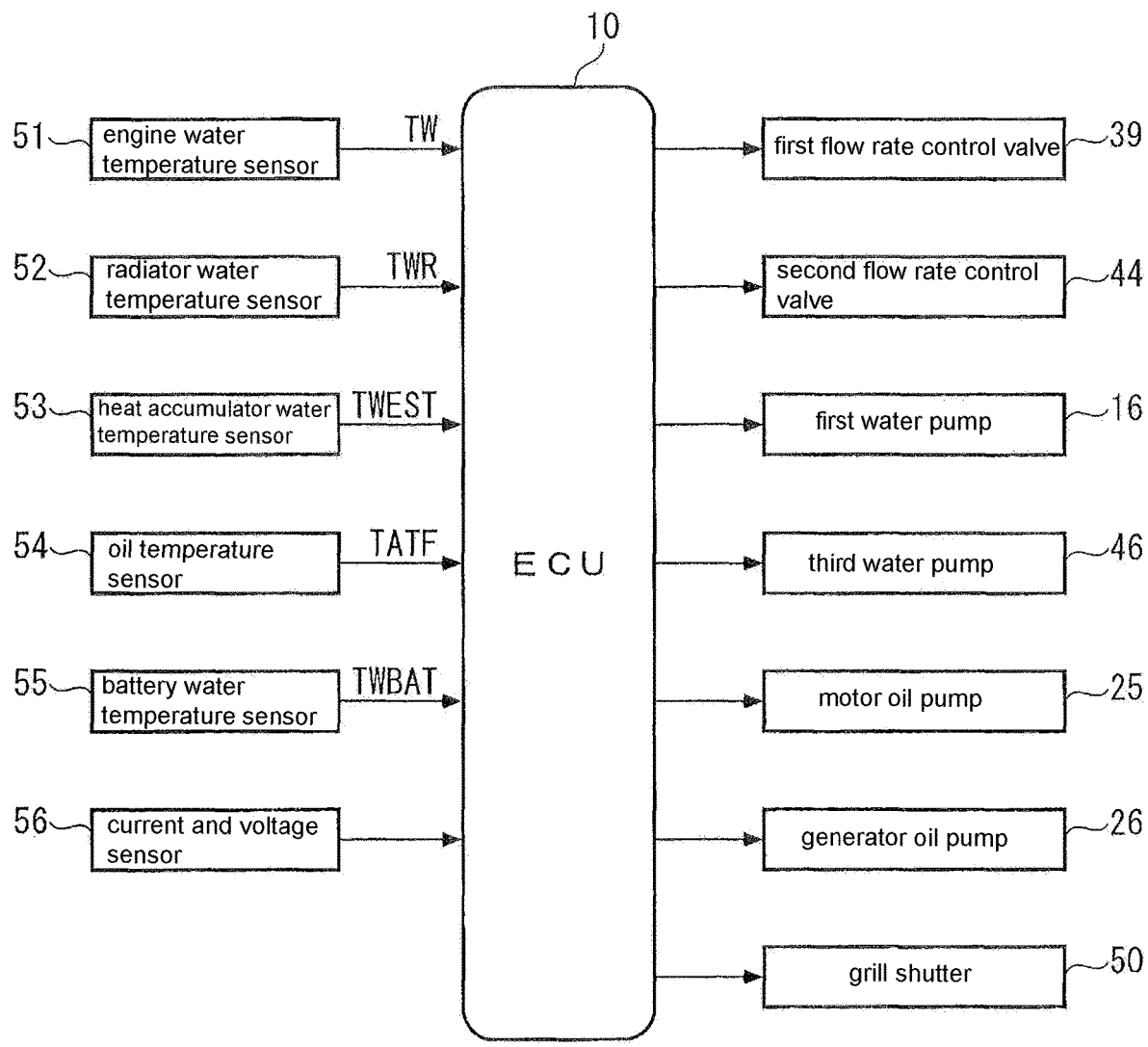
FIG. 2 is a block diagram showing a control device in the cooling device of FIG. 1.

In addition, the ECU 10 performs, particularly in the embodiment, a heat distribution control process for distributing the heat generated by the generator 5 during the regenerative operation by controlling the device shown in FIG. 2 and the like.

Figure 3:
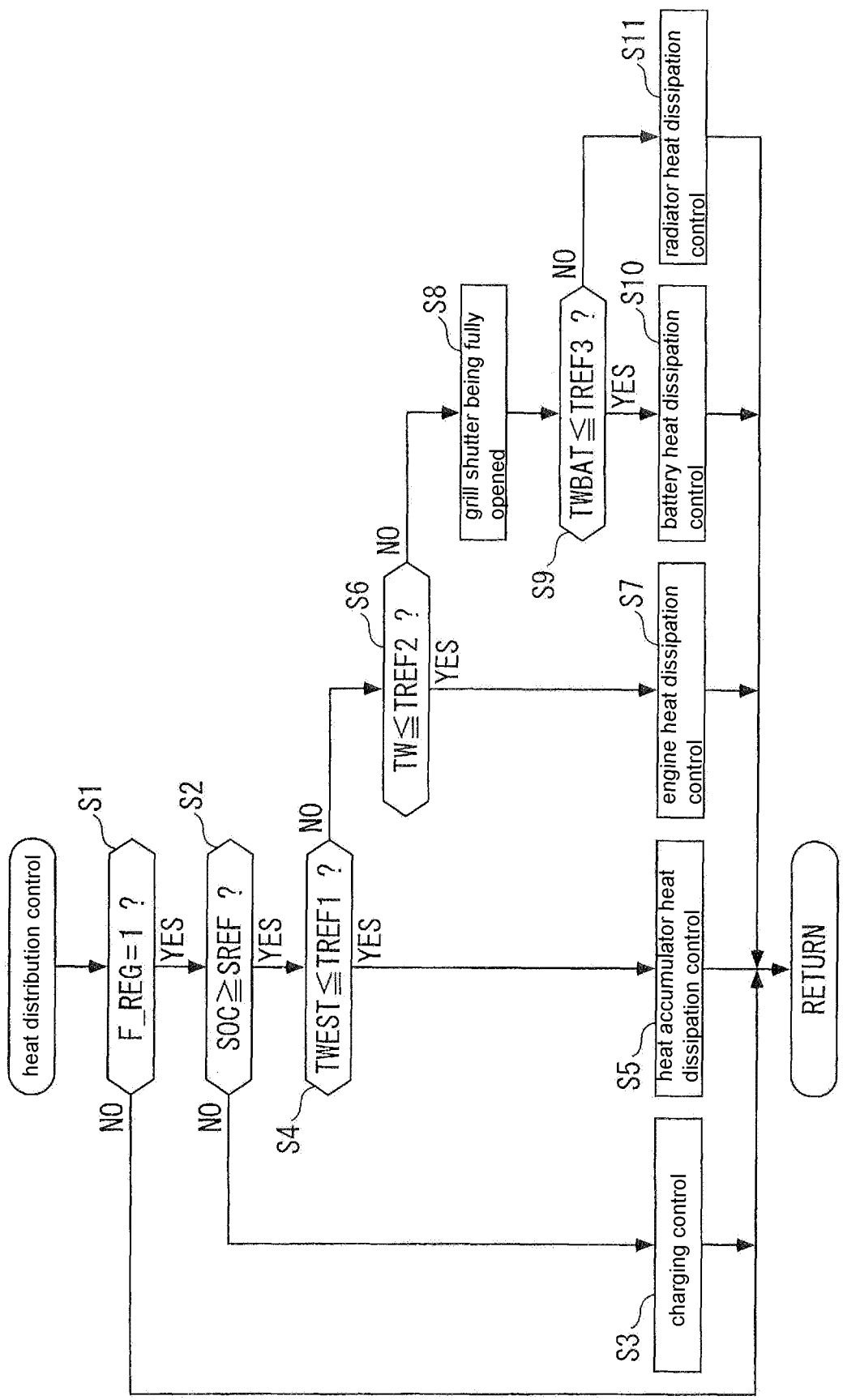
FIG. 3 is a flowchart showing a heat distribution control process performed by the control device of FIG. 2.

FIG. 3 shows the heat distribution control process. The process is repeatedly performed, for example, at a predetermined cycle. First, in step 1 (illustrated as "S1", the same applies hereinafter) of the process, a determination is made on whether a regenerative operation flag F_REG is "1". The regenerative operation flag F_REG is set to "1" when the regenerative operation of the generator 5 is performed during deceleration of the vehicle in which the engine 2 is stopped. When the answer to step 1 is NO and the regenerative operation is not being performed, the process is directly ended.

When the answer to step 1 is YES and the regenerative operation is being performed, a determination is made on whether the charging rate SOC of the battery 31 is equal to or larger than a predetermined value SREF (step 2). The predetermined value SREF is set to correspond to, for example, a fully charged state (for example, 90%) of the battery 31. When this answer is NO and SOC<SREF, it is assumed that the battery 31 can be charged, charging control is performed to charge the battery 31 with the electric power generated by the regenerative operation (step 3), and the process is ended. By the charging control, the electric power generated by the regenerative operation can be regenerated according to the charging rate SOC of the battery 31.

When the answer to step 3 described above is YES and SOC≥SREF, it is assumed that the battery 31 cannot be charged, the heat distribution control is performed to distribute/dissipate the heat generated by the regenerative operation to the appropriate device of the cooling device 1 in the next step 4 and the subsequent steps. First, in step 4, a determination is made on whether the detected heat accumulator water temperature TWEST is equal to or less than the first predetermined temperature TREF1 (for example, 90° C.).

Figure 4:
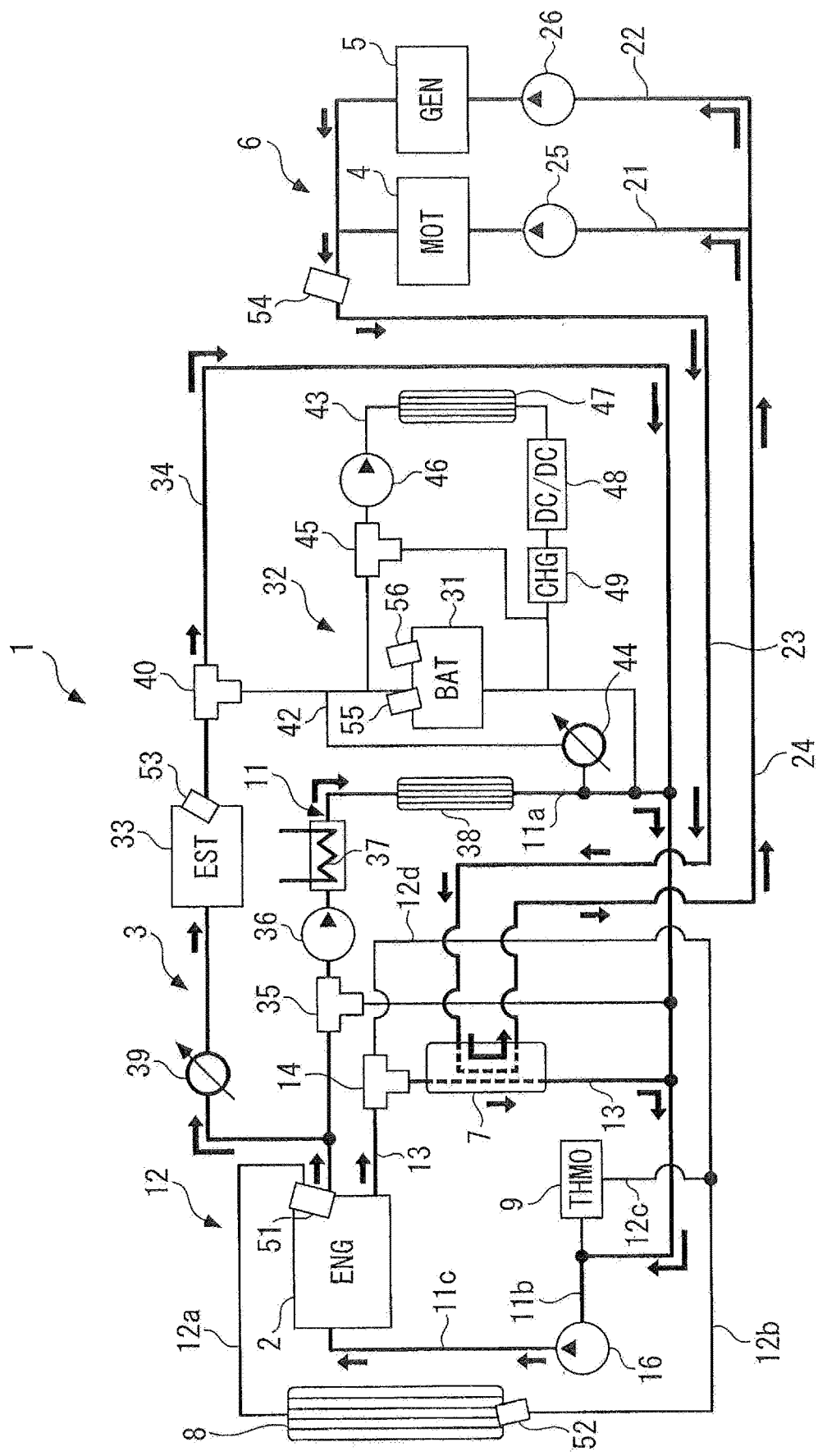
FIG. 4 is an explanatory diagram for illustrating the flow of cooling water of an engine cooling circuit and the flow of oil of a motor generator cooling circuit in the cooling device in a state of heat dissipation control to a heat accumulator.

When the answer is YES and TWEST≤TREF1, it is assumed that the heat accumulation in the heat accumulator 33 is not sufficient, the heat dissipation control to the heat accumulator 33 is performed to promote the heat accumulation (step 5), and the process is ended. In the heat accumulator heat dissipation control, the first flow rate control valve 39 is opened and the second flow rate control valve 44 is closed in a state that the first water pump 16 or the motor oil pump 25 and the generator oil pump 26 are operating. FIG. 4 shows the flow of the cooling water and the oil in the heat accumulator heat dissipation control state. Besides, in FIG. 4 and FIGS. 5-7 described later, the flow paths through which the cooling water or the oil flows are represented by thick lines, the directions of the flow are indicated by arrows, and the flow paths through which the cooling water or the oil does not flow are represented by thin lines.

As shown in FIG. 4, in the control state, the motor oil pump 25 and the generator oil pump 26 are in operation, and thereby the oil of the MG cooling circuit 6 flows from the motor 4 and the generator 5 side to the feed flow path 23, flows into the heat exchanger 7 and flows out through the inside of the heat exchanger 7, and then returns to the motor 4 and the generator 5 via the return flow path 24.

On the other hand, the first water pump 16 are in operation, and thereby the cooling water of the engine cooling circuit 3 circulates from the engine 2 via the main circuit 11. In addition, the cooling water flows from the engine 2 into the heat exchanger 7 via the heat exchanger flow path 13, and is heated by heat exchange with the high temperature oil, and then flows out of the heat exchanger 7 and returns to the engine 2.

In addition, the first flow rate control valve 39 is in the open state, and thereby the heated cooling water flows from the engine 2 into the heat accumulator 33 via the heat accumulator flow path 34. Accordingly, in the heat accumulator heat dissipation control, the heat generated by the regenerative operation can be dissipated to the heat accumulator 33 in a low temperature state and effectively utilized for heat accumulation in the heat accumulator 33.

Returning to FIG. 3, when the answer to step 4 is NO and TWEST>TREF1, it is assumed that the heat accumulation of the heat accumulator 33 is sufficient, the process proceeds to step 6, and a determination is made on whether the engine water temperature TW is equal to or less than the second predetermined temperature TREF2. The second predetermined temperature TREF2 is set to, for example, a predetermined value (for example, 90° C.) according to the operation temperature of the thermostat 9.

When the answer to step 6 is YES and TW≤TREF2, it is assumed that the thermostat 9 is not in operation and the warm-up of the engine 2 is not completed, the heat dissipation control to the engine 2 is performed (step 7), and the process is ended.

Figure 5:
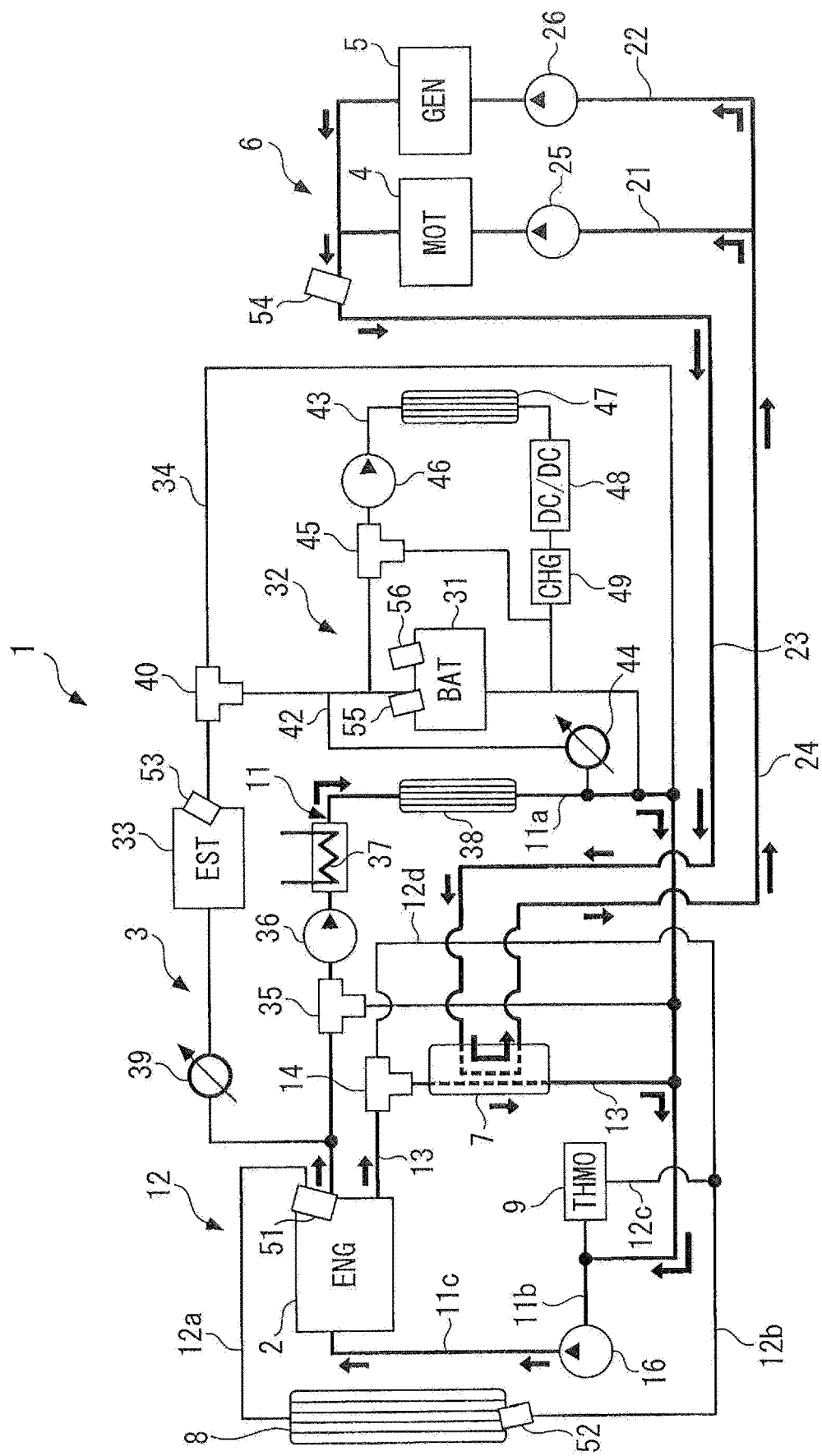
FIG. 5 is an explanatory diagram similar to FIG. 4 in a state of heat dissipation control to an internal combustion engine.

In the engine heat dissipation control, the first flow rate control valve 39 is closed from the heat accumulator heat dissipation control state described above. As shown in FIG. 5, in the control state, similar to the case of the heat accumulator heat dissipation control, the heat exchange between the cooling water and the oil is performed in the heat exchanger 7, and the temperature of the cooling water is raised. In addition, the first flow rate control valve 39 is in the closed state, and thereby the heated cooling water does not flow from the engine 2 into the heat accumulator 33, and circulates via the main circuit 11. Accordingly, in the engine heat dissipation control, the heat generated by the regenerative operation can be dissipated to the engine 2 and effectively utilized for the warm-up of the engine 2.

Returning to FIG. 3, when the answer to step 6 is NO and TW>TREF2, it is assumed that the warm-up of the engine 2 is completed and the thermostat 9 is in operation, and the grill shutter 50 is controlled to be fully opened to promote the heat dissipation performed by the radiator 8 (step 8). In addition, a determination is made on whether the battery water temperature TWBAT is equal to or less than the third predetermined temperature TREF3 (step 9). The third predetermined temperature TREF3 is set to, for example, a predetermined value (for example, 30° C.) lower than the upper limit temperature of the battery 31.

When the answer to step 9 is YES and TWBAT≤TREF3, it is assumed that the battery 31 is in the low temperature state, the heat dissipation control to the battery 31 is performed to promote the temperature raising (warm-up) of the battery 31 (step 10), and the process is ended.

Figure 6:
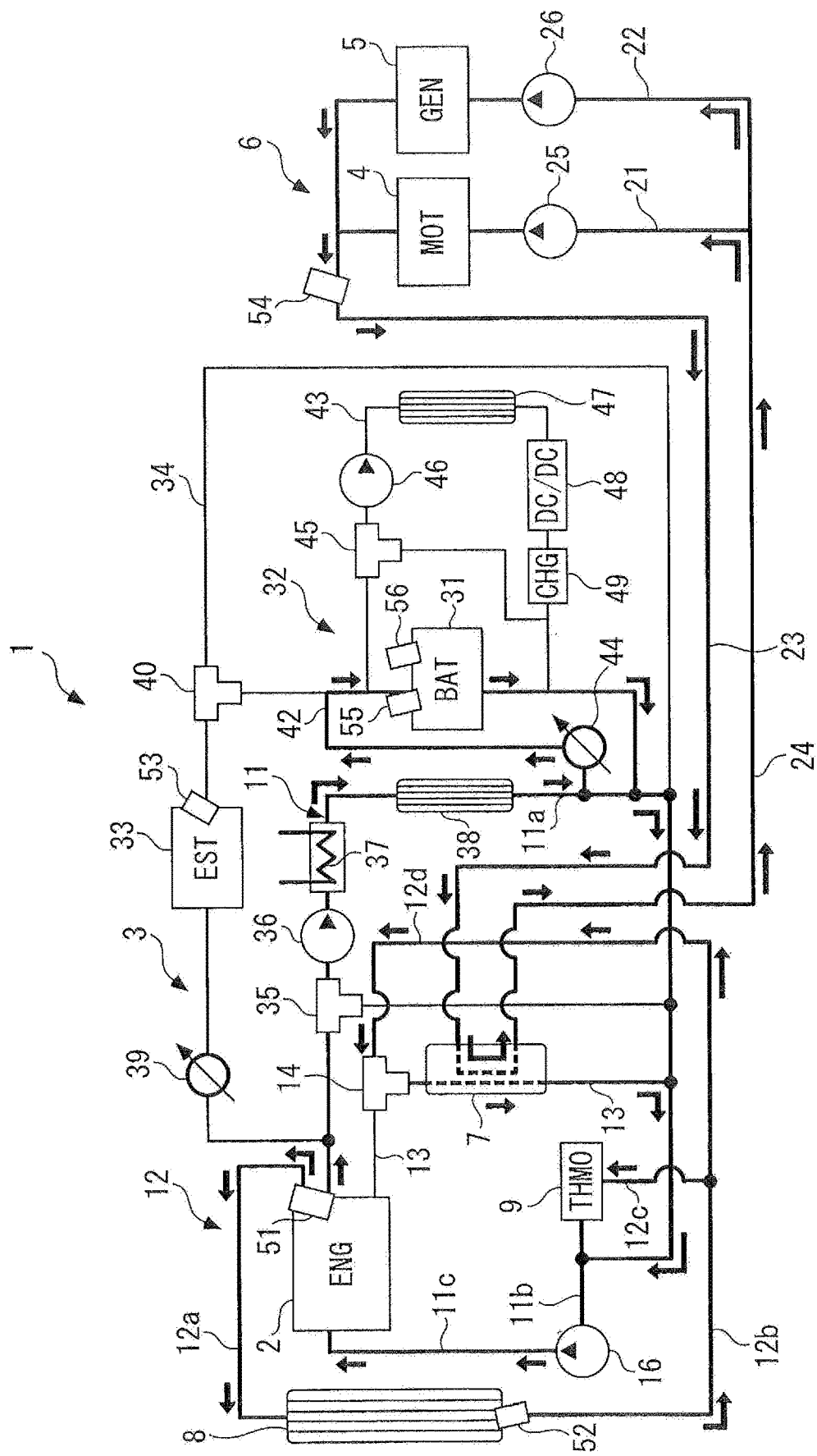
FIG. 6 is an explanatory diagram similar to FIG. 4 in a state of heat dissipation control to a battery.

In the battery heat dissipation control, the second flow rate control valve 44 is opened from the engine heat dissipation control state described above. As shown in FIG. 6, in the control state, the cooling water flows through the radiator circuit 12 in accordance with the operation of the thermostat 9, and thereby the heat of the cooling water is dissipated from the radiator 8 to the outside. The heat dissipation from the radiator 8 is promoted by the grill shutter 50 that is fully opened. In addition, the second flow rate control valve 44 is in the open state, and thereby the cooling water heated by heat exchange in the heat exchanger 7 flows in the main circuit 42 of the battery cooling circuit 32 and flows into the battery 31. Thereby, in the battery heat dissipation control, the heat generated by the regenerative operation can be dissipated to the battery 31 and effectively utilized for the temperature raising of the battery 31.

On the other hand, when the answer to step 9 is YES and TWBAT>TREF3, it is assumed that the temperature raising of the battery 31 is completed, the heat dissipation control to the battery radiator 47 is performed (step 11), and the process is ended.

Figure 7:
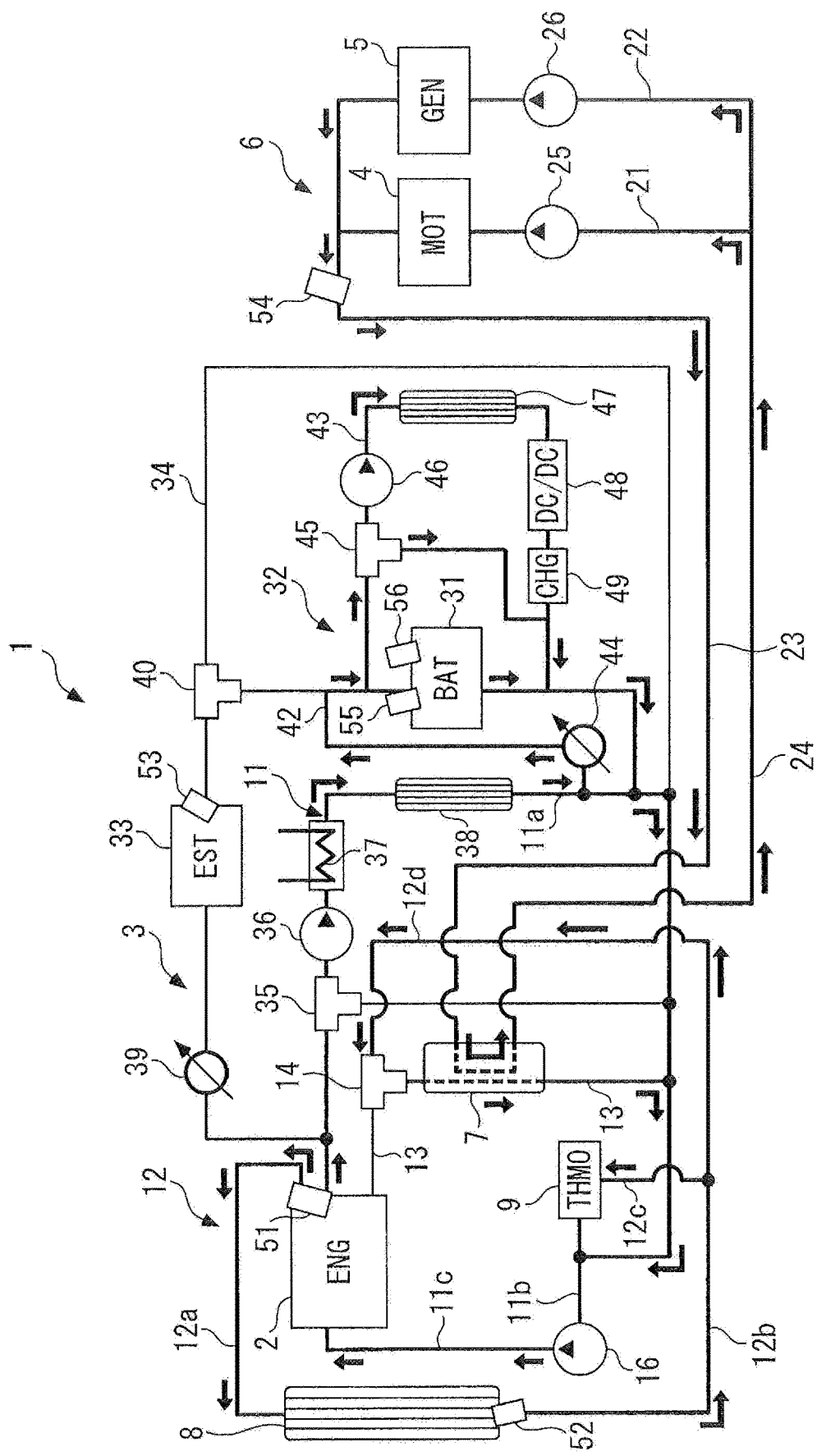
FIG. 7 is an explanatory diagram similar to FIG. 4 in a state of heat dissipation control to a radiator.

In the radiator heat dissipation control, the third water pump 46 is driven from the battery heat dissipation control state described above. Thereby, as shown in FIG. 7, the cooling water in the battery cooling circuit 32 is sent to the battery radiator 47. Accordingly, in the radiator heat dissipation control, after the temperature raising of the battery 31 is completed, the heat generated by the regenerative operation can be dissipated to the battery radiator 47 and effectively dissipated to the outside.

Besides, the disclosure is not limited to the described embodiments and can be implemented in various aspects. For example, in the embodiments, when the condition that the charging rate SOC of the battery 31 is equal to or larger than the predetermined value SREF is satisfied, it is assumed that the battery 31 is fully charged and cannot be charged, and the heat dissipation control is performed. The disclosure can also perform the heat dissipation control when the battery 31 is not fully charged for example, without setting the above condition, and thereby the heat generated by the regenerative operation can be actively utilized to perform heat accumulation in the heat accumulator or warm-up of the internal combustion engine, and the like.

In addition, in the embodiments, the heat accumulator 33, the engine 2, or the battery 31 is subjected to heat dissipation as a device that requires the heat generated by the regenerative operation, and the engine radiator 8 or the battery radiator 47 is subjected to heat dissipation as a device for dissipating the heat generated by the regenerative operation to the outside, but the disclosure is not limited hereto, and other suitable devices that require or dissipate heat may also be employed.

In addition, in the embodiments, as the temperature representative of the heat accumulator 33, the engine 2, or the battery 31, the temperature of the cooling water in each device is used, but the disclosure is not limited hereto, and the temperature of the main body of each device may also be used. In addition, the motor 4 and the generator 5 are configured separately from each other, but the motor 4 and the generator 5 may also be integral. Furthermore, the configuration of the cooling device 1 shown in FIG. 1 and the like is merely an illustration, and the detailed configuration can be changed within the scope of the gist of the disclosure.

Other Configurations

According to one embodiment, the disclosure provides a heat distribution device for hybrid vehicle, which distributes, in a hybrid vehicle having an internal combustion engine 2 and a motor generator (a motor 4 and a generator 5 in the embodiment (hereinafter, the same applies to this technical solution)), heat generated in the motor generator, the motor generator converting an electric power of a battery 31 into a mechanical power or converting the mechanical power into the electric power by a regenerative operation and collecting the electric power to the battery 31. The heat distribution device for hybrid vehicle includes: an engine cooling circuit 3 through which cooling water for cooling the internal combustion engine 2 circulates; a motor generator cooling circuit (a MG cooling circuit 6) through which a refrigerant for cooling the motor generator circulates and which is independent from the engine cooling circuit 3; a heat exchanger 7 which performs heat exchange between the cooling water of the engine cooling circuit 3 and the refrigerant of the motor generator cooling circuit; a charging rate acquisition unit (a current and voltage sensor 56, an ECU 10) which acquires a charging rate SOC of the battery 31; a charging determination unit (ECU 10, step 2 in FIG. 3) which determines, based on the acquired charging rate SOC of the battery 31, whether the battery 31 can be charged; and a control unit (the ECU 10, step 4 and subsequent steps in FIG. 3), wherein in a case the regenerative operation is performed, the control unit performs charging controls to charge the battery 31 with the electric power generated by the regenerative operation when it is determined that the battery 31 can be charged (step 3 in FIG. 3), and performs heat dissipation controls to transfer the heat generated by the regenerative operation to the heat exchanger 7 via the motor generator cooling circuit and dissipate the heat to the engine cooling circuit 3 side by the heat exchange in the heat exchanger 7 when it is determined that the battery 31 cannot be charged.

According to this configuration, the engine cooling circuit through which the cooling water for cooling the internal combustion engine circulates and the motor generator cooling circuit through which the refrigerant for cooling the motor generator circulates are arranged independent from each other, and the heat exchange between the cooling water and the refrigerant is performed in the heat exchanger. In addition, the determination on whether the battery can be charged is made based on the acquired charging rate of the battery.

Then, when it is determined that the battery can be charged in a case of performing the regenerative operation, the electric power generated by the regenerative operation is charged into the battery. Thereby, regeneration of the electric power generated by the regenerative operation can be performed corresponding to the conditions on the battery side.

On the other hand, when it is determined that the battery cannot be charged, the heat dissipation control is performed in which the heat generated by the regenerative operation is transferred to the heat exchanger via the motor generator cooling circuit and is dissipated to the engine cooling circuit side by the heat exchange in the heat exchanger. Thereby, when the battery cannot be charged, the heat generated by the regenerative operation can be effectively utilized or dissipated to the outside by dissipating the heat to the engine cooling circuit side and appropriately distributing the heat to the vehicle components.

In one embodiment, the machine cooling circuit 3 has a heat accumulator flow path 34 equipped with a heat accumulator 33 for accumulating heat of the cooling water, and further includes a heat accumulator water temperature detection unit (a heat accumulator water temperature sensor 53) which detects a temperature of the heat accumulator 33 (a heat accumulator water temperature TWEST); and the control unit performs the heat dissipation to the heat accumulator 33 when the detected temperature of the heat accumulator 33 is equal to or less than a first predetermined temperature TREF1 (steps 4 and 5 in FIG. 3).

According to this configuration, when the temperature of the heat accumulator is equal to or less than the first predetermined temperature, the heat dissipation to the heat accumulator is performed. Thereby, the heat generated by the regenerative operation can be effectively utilized for heat accumulation in the heat accumulator by dissipating the heat to the heat accumulator in a low temperature state.

In one embodiment, the heat distribution device for hybrid vehicle above further includes an engine temperature detection unit (an engine water temperature sensor 51) that detects a temperature of the internal combustion engine 2 (an engine water temperature TW), wherein the control unit ends the heat dissipation to the heat accumulator 33 when the temperature of the heat accumulator exceeds the first predetermined temperature TREF1, and performs the heat dissipation to the internal combustion engine 2 for warm-up when the detected temperature of the internal combustion engine 2 is equal to or less than a second predetermined temperature TREF2 (steps 6 and 7 in FIG. 3).

According to this configuration, when the temperature of the heat accumulator exceeds the first predetermined temperature, it is assumed that the heat accumulation to the heat accumulator is completed, and the heat dissipation to the heat accumulator can be ended at an appropriate timing without wasting the heat generated by the regenerative operation. In addition, when the detected temperature of the internal combustion engine is equal to or less than the second predetermined temperature, the heat dissipation to the internal combustion engine is performed for warm-up. Thereby, the heat generated by the regenerative operation can be effectively utilized for the warm-up of the internal combustion engine.

In one embodiment, the engine cooling circuit 3 has a radiator circuit 12 equipped with a radiator 8 for dissipating the heat of the cooling water to an outside, and further includes a thermostat 9 that opens the radiator circuit 12 when the temperature of the internal combustion engine 2 exceeds the second predetermined temperature TREF2.

According to this configuration, when the temperature of the internal combustion engine exceeds the second predetermined temperature, the thermostat operates and opens the radiator circuit to thereby send the cooling water to the radiator. Accordingly, after the warm-up of the internal combustion engine is completed, the heat generated by the regenerative operation can be sent to the radiator and effectively dissipated to the outside.

In one embodiment, the heat distribution device for hybrid vehicle above further includes a battery cooling circuit 32 which is connected to the engine cooling circuit 3 and through which cooling water for cooling the battery 31 circulates, and a battery temperature detection unit (a battery water temperature sensor 55) which detects the temperature of the battery 31 (a battery water temperature TWBAT), wherein the control unit opens the battery cooling circuit 32 and thereby performs the heat dissipation to the battery 31 for temperature raising when the temperature of the battery 31 is equal to or less than a third predetermined temperature TREF3 after the temperature of the internal combustion engine 2 exceeds the second predetermined temperature TREF2 (steps 9 and 10 in FIG. 3).

According to this configuration, the battery cooling circuit is connected to the engine cooling circuit, and the cooling water for cooling the battery circulates through the battery cooling circuit. Then, when the detected temperature of the battery is equal to or less than the third predetermined temperature after the temperature of the internal combustion engine exceeds the second predetermined temperature, the heat dissipation to the battery for temperature raising (warm-up) is performed by opening the battery cooling circuit. Accordingly, the heat generated by the regenerative operation can be effectively utilized for the temperature raising of the battery.

In one embodiment, the battery cooling circuit 32 has a battery radiator circuit 43 equipped with a battery radiator 47 for dissipating the heat of the cooling water to the outside, and the control unit performs the heat dissipation to the battery radiator 47 when the temperature of the battery 31 exceeds the third predetermined temperature TREF3 (steps 9 and 11 in FIG. 3).

According to this configuration, when the temperature of the battery exceeds the third predetermined temperature and the temperature raising of the battery is completed, the heat dissipation to the battery radiator is performed. Thereby, after the temperature raising of the battery is completed, the heat generated by the regenerative operation can be sent to the battery radiator and effectively dissipated to the outside.

In addition, according to another embodiment, the disclosure provides a heat distribution device for hybrid vehicle, which distributes, in a hybrid vehicle having an internal combustion engine 2 and a motor generator (a motor 4 and a generator 5), heat generated by a regenerative operation of the motor generator, the motor generator converting an electric power of a battery 31 into a mechanical power or converting the mechanical power into the electric power by the regenerative operation and collecting the electric power to the battery 31. The heat distribution device for hybrid vehicle includes: an engine cooling circuit 3 through which cooling water for cooling the internal combustion engine 2 circulates; a motor generator cooling circuit (a MG cooling circuit 6) through which a refrigerant for cooling the motor generator circulates and which is independent from the engine cooling circuit 3; a heat exchanger 7 which performs heat exchange between the cooling water of the engine cooling circuit 3 and the refrigerant of the motor generator cooling circuit; and a control unit (ECU 10, step 4 and subsequent steps in FIG. 3) which performs heat dissipation control in which the heat generated by the regenerative operation is transferred to the heat exchanger 7 via the motor generator cooling circuit and is dissipated to the engine cooling circuit 3 side by the heat exchange in the heat exchanger 7. The engine cooling circuit 3 has a main circuit 11 in which the cooling water circulates through the internal combustion engine 2, a heat accumulator flow path 34 which is connected to the main circuit 11 and is equipped with a heat accumulator 33 for accumulating heat of the cooling water, and a radiator circuit 12 which is connected to the main circuit 11 and is equipped with a radiator 8 for dissipating the heat of the cooling water to an outside. The engine cooling circuit further includes a first on-off valve (a first flow rate control valve 39) for opening and closing the heat accumulator flow path 34, a second on-off valve (a thermostat 9) for opening and closing the radiator circuit 12 according to a temperature of the internal combustion engine 2, and temperature detection units (an engine water temperature sensor 51, a heat accumulator water temperature sensor 53) which respectively detect the temperature of the internal combustion engine 2 (an engine water temperature TW) and a temperature of the heat accumulator 33 (a heat accumulator water temperature TWEST). The control unit controls heat dissipation to the heat accumulator 33, the internal combustion engine 2, and the radiator 8 by controlling the first on-off valve according to the detected temperature of the internal combustion engine 2 and the detected temperature of the heat accumulator 33.

In this configuration, similar to the case of technical solution 1 described above, the engine cooling circuit through which the cooling water for cooling the internal combustion engine circulates and the motor generator cooling circuit through which the refrigerant for cooling the motor generator circulates are arranged independent from each other, and the heat exchange between the cooling water and the refrigerant is performed in the heat exchanger. In addition, the engine cooling circuit has a main circuit in which the cooling water circulates through the internal combustion engine, a heat accumulator flow path which is connected to the main circuit and is equipped with a heat accumulator for accumulating the heat of the cooling water, and a radiator circuit which is connected to the main circuit and is equipped with a radiator for dissipating the heat of the cooling water to the outside; and the engine cooling circuit further includes a first on-off valve for opening and closing the heat accumulator flow path, and a second on-off valve for opening and closing the radiator circuit according to the temperature of the internal combustion engine.

According to the disclosure, the heat dissipation control is performed in which the heat generated by the regenerative operation is transferred to the heat exchanger via the motor generator cooling circuit and is dissipated to the engine cooling circuit side by the heat exchange in the heat exchanger. In addition, in this heat dissipation control, the heat dissipation to the heat accumulator, the internal combustion engine, and the radiator is controlled by controlling the first on-off valve according to the detected temperature of the internal combustion engine and the detected temperature of the heat accumulator.

Accordingly, regardless of a charging state of the battery, the heat generated by the regenerative operation can be appropriately distributed to the heat accumulator, the internal combustion engine, or the radiator according to the actual temperatures of the internal combustion engine and the heat accumulator, and can be effectively utilized or dissipated.

In one embodiment, the control unit opens the first on-off valve when the temperature of the heat accumulator 33 is equal to or less than the first predetermined temperature TREF1 and thereby performs the heat dissipation to the heat accumulator 33 (steps 4 and 5 in FIG. 3).

According to this configuration, when the temperature of the heat accumulator is equal to or less than the first predetermined temperature, the first on-off valve is opened to thereby open the heat accumulator flow path and perform the heat dissipation to the heat accumulator. Accordingly, the heat generated by the regenerative operation can be effectively utilized for heat accumulation in the heat accumulator by dissipating the heat to the heat accumulator in a low temperature state. In addition, when the temperature of the heat accumulator exceeds the first predetermined temperature, it is assumed that the heat accumulation to the heat accumulator is completed, and the heat dissipation to the heat accumulator can be ended at an appropriate timing by closing the first on-off valve and blocking the heat accumulator flow path without wasting the heat generated by the regenerative operation.

In one embodiment, the second on-off valve is configured to be kept in a closed state when the temperature of the internal combustion engine 2 is equal to or less than the second predetermined temperature TREF2 and be opened when the temperature of the internal combustion engine 2 exceeds the second predetermined temperature TREF2.

According to this configuration, for example, when the temperature of the internal combustion engine is equal to or less than the second predetermined temperature after the end of the heat dissipation to the regenerator, the second on-off valve is kept in the closed state and the radiator circuit is blocked, and thereby the heat generated by the regenerative operation can be dissipated to the internal combustion engine and utilized for warm-up. In addition, when the temperature of the internal combustion engine exceeds the second predetermined temperature, the second on-off valve is opened and the radiator circuit is opened, and thereby the cooling water is sent to the radiator. Accordingly, after the completion of the warm-up of the internal combustion engine, the heat generated by the regenerative operation can be sent to the radiator and effectively dissipated to the outside.

In one embodiment, the heat distribution device for hybrid vehicle above further includes: a battery cooling circuit 32 which is connected to the engine cooling circuit 3 and through which cooling water for cooling the battery 31 circulates, a third on-off valve (a second flow rate control valve 44) for opening and closing the battery cooling circuit 32, and a battery temperature detection unit (a battery water temperature sensor 55) which detects a temperature of the battery 31 (a battery water temperature TWBAT); wherein the control unit opens the third on-off valve and thereby performs the heat dissipation to the battery 31 for warm-up when the detected temperature of the battery 31 is equal to or less than a third predetermined temperature TREF3 after the temperature of the internal combustion engine 2 exceeds the second predetermined temperature TREF2 (steps 9 and 10 in FIG. 3).

According to this configuration, the battery cooling circuit is connected to the engine cooling circuit, and the cooling water for cooling the battery circulates through the battery cooling circuit. Then, when the battery temperature is equal to or less than the third predetermined temperature after the temperature of the internal combustion engine exceeds the second predetermined temperature, the third on-off valve is opened and the battery cooling circuit is opened to thereby perform the heat dissipation to the battery for temperature raising. Accordingly, the heat generated by the regenerative operation can be effectively utilized for the temperature raising of the battery.

In one embodiment, the battery cooling circuit 32 has a radiator circuit 43 equipped with a battery radiator 47 for dissipating the heat of the cooling water to the outside, and further includes a water pump (a third water pump 46) for sending the cooling water toward the battery radiator 47; and the control unit dries the water pump and thereby perform the heat dissipation to the battery radiator 47 when the temperature of the battery 31 exceeds the third predetermined temperature TREF3 (steps 9 and 11 in FIG. 3).

According to this configuration, when the temperature of the battery exceeds the third predetermined temperature, the heat dissipation to the battery radiator is performed by driving the water pump. Accordingly, after the temperature raising of the battery is completed, the heat generated by the regenerative operation can be sent to the battery radiator and effectively dissipated to the outside.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heat distribution device for hybrid vehicle, which distributes, in a hybrid vehicle having an internal combustion engine and a motor generator, heat generated in the motor generator, the motor generator converting an electric power of a battery into a mechanical power or converting the mechanical power into the electric power by a regenerative operation and collecting the electric power to the battery, the heat distribution device for hybrid vehicle comprising:

an engine cooling circuit through which cooling water for cooling the internal combustion engine circulates;

a motor generator cooling circuit through which a refrigerant for cooling the motor generator circulates and which is independent from the engine cooling circuit;

a heat exchanger which performs heat exchange between the cooling water of the engine cooling circuit and the refrigerant of the motor generator cooling circuit;

a charging rate acquisition unit which acquires a charging rate of the battery;

a charging determination unit which determines, based on the acquired charging rate of the battery, whether the battery is able to be charged; and a control unit, wherein in a case that the regenerative operation is performed, the control unit performs charging controls to charge the battery with the electric power generated by the regenerative operation when it is determined that the battery is able to be charged, and performs heat dissipation controls to transfer heat generated by the regenerative operation to the heat exchanger via the motor generator cooling circuit and dissipate the heat to the engine cooling circuit side by the heat exchange in the heat exchanger when it is determined that the battery is not able to be charged.

2. The heat distribution device for hybrid vehicle according to claim 1, wherein the engine cooling circuit has a heat accumulator flow path equipped with a heat accumulator for accumulating heat of the cooling water, the engine cooling circuit further comprises a heat accumulator water temperature detection unit which detects a temperature of the heat accumulator, and the control unit performs heat dissipation to the heat accumulator when the detected temperature of the heat accumulator is equal or less than a first predetermined temperature.

3. The heat distribution device for hybrid vehicle according to claim 2, further comprising an engine temperature detection unit which detects a temperature of the internal combustion engine, wherein the control unit ends the heat dissipation to the heat accumulator when the temperature of the heat accumulator exceeds the first predetermined temperature, and performs the heat dissipation to the internal combustion engine for warm-up when the detected temperature of the internal combustion engine is equal or less than a second predetermined temperature.

4. The heat distribution device for hybrid vehicle according to claim 3, wherein the engine cooling circuit has a radiator circuit equipped with a radiator for dissipating the heat of the cooling water to an outside, and the engine cooling circuit further comprises a thermostat which opens the radiator circuit when the temperature of the internal combustion engine exceeds the second predetermined temperature.

5. The heat distribution device for hybrid vehicle according to claim 4, further comprising: a battery cooling circuit which is connected to the engine cooling circuit and through which cooling water for cooling the battery circulates, and a battery temperature detection unit which detects the temperature of the battery;

wherein the control unit opens the battery cooling circuit and thereby performs the heat dissipation to the battery for temperature raising when the detected temperature of the battery is equal to or less than a third predetermined temperature after the temperature of the internal combustion engine exceeds the second predetermined temperature.

6. The heat distribution device for hybrid vehicle according to claim 5, wherein the battery cooling circuit has a radiator circuit equipped with a battery radiator for dissipating the heat of the cooling water to the outside, and the control unit performs the heat dissipation to the battery radiator when the temperature of the battery exceeds the third predetermined temperature.

\* \* \* \* \*